United States Patent
Jaisle

(10) Patent No.: US 7,140,848 B2
(45) Date of Patent: Nov. 28, 2006

(54) TURBOCHARGER WITH AIR-COOLED MAGNETIC BEARING SYSTEM

(75) Inventor: Jens-Wolf Jaisle, Stuttgart (DE)

(73) Assignee: BorgWarner Inc., Auburn Hills, MI (US)

( * ) Notice: Subject to any disclaimer, the term of this patent is extended or adjusted under 35 U.S.C. 154(b) by 19 days.

(21) Appl. No.: 10/644,391

(22) Filed: Aug. 20, 2003

(65) Prior Publication Data

US 2004/0088976 A1    May 13, 2004

(30) Foreign Application Priority Data

Aug. 20, 2002   (EP)   ................................. 02018636

(51) Int. Cl.
| | |
|---|---|
| F02B 35/00 | (2006.01) |
| H02K 7/09 | (2006.01) |
| H02K 5/16 | (2006.01) |
| F16C 41/00 | (2006.01) |
| F16C 32/06 | (2006.01) |
| F02B 39/00 | (2006.01) |
| F02B 17/00 | (2006.01) |
| H02K 7/08 | (2006.01) |

(52) U.S. Cl. ...................... 417/407; 310/90.5; 310/90; 384/624; 384/107

(58) Field of Classification Search ................ 417/407; 60/605.1; 310/90.5, 90, 179; 384/624, 107
See application file for complete search history.

(56) References Cited

U.S. PATENT DOCUMENTS

| | | | | |
|---|---|---|---|---|
| 2,973,136 | A | * | 2/1961 | Greenwald .................. 417/407 |
| 3,890,019 | A | * | 6/1975 | Boden et al. ................ 310/90.5 |
| 5,310,311 | A | * | 5/1994 | Andres et al. ............... 310/90.5 |
| 5,481,146 | A | * | 1/1996 | Davey ....................... 310/90.5 |
| 5,521,448 | A | * | 5/1996 | Tecza et al. ................ 310/90.5 |
| 5,634,326 | A | * | 6/1997 | Wanger ....................... 384/107 |
| 6,043,580 | A | * | 3/2000 | Vogel et al. ................. 310/179 |
| 6,668,553 | B1 | * | 12/2003 | Ghizawi ..................... 60/605.1 |
| 6,846,167 | B1 | * | 1/2005 | Jaisle ........................ 417/407 |
| 2005/0193732 | A1 | * | 9/2005 | LaRue ....................... 60/605.1 |
| 2005/0198956 | A1 | * | 9/2005 | Fremerey et al. ........... 60/605.1 |
| 2005/0210875 | A1 | * | 9/2005 | Larue et al. .................. 60/602 |

FOREIGN PATENT DOCUMENTS

| | | | | |
|---|---|---|---|---|
| DE | 10040508 A1 | * | 2/2002 | ................ 60/605.1 |
| FR | 2785734 A1 | * | 5/2000 | |
| JP | 58138223 A | * | 8/1983 | ................ 60/605.1 |
| JP | 01080799 A | * | 3/1989 | |
| JP | 03155357 | * | 7/1991 | |
| JP | 2000046000 A | * | 2/2000 | |

* cited by examiner

*Primary Examiner*—Thai-Ba Trieu
(74) *Attorney, Agent, or Firm*—Akerman Senterfitt; Greg Dziegielewski

(57) ABSTRACT

The invention relates to an exhaust gas turbocharger (1) having a housing and having a shaft (2) which is arranged so as to be capable of rotating about its longitudinal axis in the housing and on which a turbine wheel (4) and a compressor wheel (3) are seated and which is guided in radial bearings (5, 6) which are embodied as magnetic bearings and in at least one axial bearing (9), the bearings (5, 6, 9) each having a bearing plate (12, 14, 16) which is seated on the shaft (2) and at least one stator (19, 20, 21, 22, 49, 50) which lies axially opposite said axial bearing (9) on at least one side, forming a gap. In order to cool the bearings, it is proposed according to the invention that at least one flow duct (62, 65), via which at least one bearing gap can have an air stream applied to it, is formed in the housing.

17 Claims, 2 Drawing Sheets

TURBOCHARGER WITH AIR-COOLED MAGNETIC BEARING SYSTEM

BACKGROUND OF THE INVENTION

1. Field of the Invention

The invention relates to an exhaust gas turbocharger having a housing and having a shaft which is arranged so as to be capable of rotating about its longitudinal axis in the housing and on which a turbine wheel and a compressor wheel are seated and which is guided in radial bearings which are embodied as magnetic bearings and in at least one axial bearing, the bearings each having a bearing plate which is seated on the shaft and at least one stator which lies axially opposite said bearing plate on at least one side, thus forming a gap between the bearing plate and the stator. The invention also relates to a method for cooling the bearings of such an exhaust gas turbocharger.

2. Description of the Related Art

Exhaust gas turbochargers are used to improve the efficiency, and thus increase the performance, of internal combustion engines. They have a shaft which is provided at one end with a turbine wheel and at the other end with a compressor wheel. The turbine wheel has the exhaust gas stream of the internal combustion engine applied to it, essentially part of the thermal energy of the exhaust gas being converted into a rotary movement by the turbine wheel. The compressor wheel is driven by means of the shaft, sucks in fresh air and allows it to flow under excess pressure into the inlet ducts of the internal combustion engine, thus improving the volumetric efficiency.

Stringent demands are made of the bearings of the shaft of exhaust gas turbochargers. On the one hand, the shaft reaches high rotational speeds of up to 300 000 rpm. On the other hand, the exhaust gas turbocharger, and thus its bearings, are exposed to high temperatures. A further problem is that the exhaust gas stream which strikes the turbine wheel generates strong axial forces which have to be absorbed in an axial bearing. Owing to the high rotational speeds, the rotating parts of the exhaust gas turbocharger must be balanced highly precisely, so that as few oscillations and vibrations as possible are generated. In addition, it is also necessary to ensure that the very wide temperature range in which an exhaust gas turbocharger operates does not lead to stresses in the bearings owing to material expansion.

Previously, plain bearings or roller bearings were exclusively applied as bearings for the shaft. Owing to the above-mentioned stresses, they are subject to considerable wear and they are responsible, along with their lubrication, for up to approximately 80% of failures of exhaust gas turbochargers. In comparison, a magnetic bearing of the shaft provides the advantage that it is possible to dispense with the use of oil as lubricant. As a result, strict exhaust gas standards for vehicles can be complied with and the reliability of turbochargers can be increased. Furthermore, magnetic bearings provide the advantage of reducing or even avoiding the need to balance the rotating components as these bearings keep the rotor on its center-of-gravity axis. In one respect it is necessary to additionally take into account the magnetic nature of such bearings in comparison with conventional oil-lubricated sliding bearings or roller bearings. While a considerable portion of the heat of the shaft is conducted away by the through-flowing lubrication oil in said conventional bearings, this is not the case with the magnetic bearing. As a result, the air located in the bearing housing is heated. However, the air must not exceed the maximum permitted temperature for the magnets which are used. When NdFeB magnets are used this limit is approximately 130° C.

SUMMARY OF THE INVENTION

The invention is therefore based on the object of providing an exhaust gas turbocharger with permanent-magnetic bearing, in which the maximum permitted temperature in the region of the magnets is not exceeded.

In order to achieve this object, the combinations of features specified in the patent claims are proposed. Advantageous embodiments and further refinements of the invention result from the dependent claims.

The basic idea of the invention is to use the bearing gaps which are necessarily present between the magnet bearings for forced cooling. According to the invention, it is therefore proposed that at least one flow duct, via which at least one bearing gap can have an air stream applied to it, is formed in the housing. The air stream is preferably branched off as a partial stream from the compressed air for the engine intake at the compressor housing. This can be achieved in that the at least one flow duct opens into a compressor housing of the turbocharger. Depending on the geometric design of the housing, the flow duct can be formed by means of a pipeline, of which sections may extend, as needed, along the outside of the housing.

The exhaust gas turbocharger will generally have at least two radial bearings and one axial bearing. According to a first alternative embodiment of the invention, a separate flow duct can therefore lead to each of the bearings or bearing gaps. According to a preferred second alternative embodiment of the invention, which can be implemented in a structurally easier way, there is however provision for the gaps between the bearings to communicate with one another via further flow ducts formed in the housing, so that the air stream can successively flow through them. Here, the flow duct preferably leads to the bearing which is nearest to the turbo wheel and which is subject to the greatest temperature loading and through which the initially still relatively cool air stream should therefore preferably flow first.

In order to lead away the air stream which flows through the bearing gaps, the housing expediently has at least one outlet opening for the air stream. The leading away of the air stream can alternatively also be achieved in a particularly simple way by virtue of the fact that a sealing ring which is usually present for the shaft in the region of the compressor wheel is omitted, as a result of which an air gap through which the air stream can emerge remains between the shaft and the housing.

The demand of cooling air for the bearings is small in comparison with the demand of air for the engine which is acted on by the turbocharger, so that the cross section of the flow duct leading into the pressurized compressor housing can be small in comparison with the cross section of the line for the compressed air which leads to the engine. An appreciable pressure loss as a result of the branching off of the cooling air is not to be feared, so that no adverse affects on the engine performance arise as a result of the branching off. Although the cooling air could basically also be supplied by an external air source, the described branching off is therefore the simplest and also most cost-effective solution.

The method according to the invention for cooling magnetic bearings of an exhaust gas turbocharger, wherein the exhaust gas turbocharger has a housing and a shaft which is arranged so as to be capable of rotating about its longitudinal axis in the housing and on which a turbine wheel and a compressor wheel are seated, and wherein the bearings have bearing plates which are arranged on the shaft and stators which are fixed to the housing and are separated from said bearing plates by an air gap, provides for the bearing gaps to have an air stream applied to them. Said air stream is preferably branched off as a partial stream from the air compressed by means of the compressor wheel, and can be conducted to at least one of the bearing gaps through a housing duct. A plurality of bearings which are present can have an air stream applied to them either independently of one another or, to the extent that they are connected to one another in terms of flow, serially. Preferably, the air stream is guided from the turbine wheel side to the compressor wheel side through the air gaps and, after it flows through at least one bearing gap, it is directed into the region outside the housing via an outlet opening, it being possible to provide the outlet opening particularly easily by omitting a compressor-wheel-side shaft sealing ring.

BRIEF DESCRIPTION OF THE DRAWINGS

The invention is explained below in more detail by reference to an embodiment which is illustrated schematically in the drawing, in which.

Figure 1:
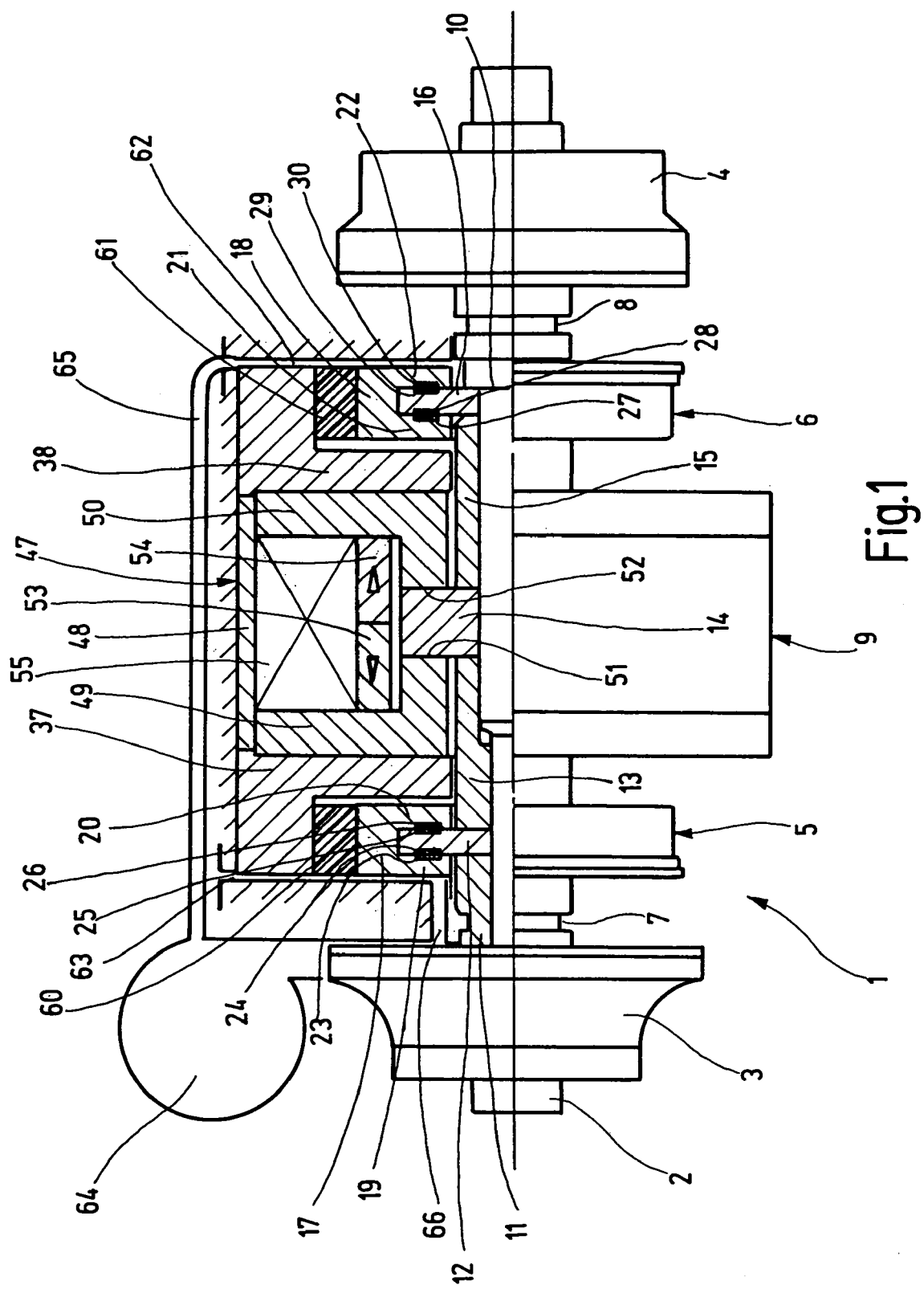
FIG. 1 shows the side view of an exhaust gas turbocharger with parts of a bearing housing with a partially sectional view of the upper part of the bearing of the shaft and with flow ducts, provided in the bearing housing, for cooling air to be applied to the bearings first to the turbine side bearing and subsequently to the compressor side bearing.
Figure 2:
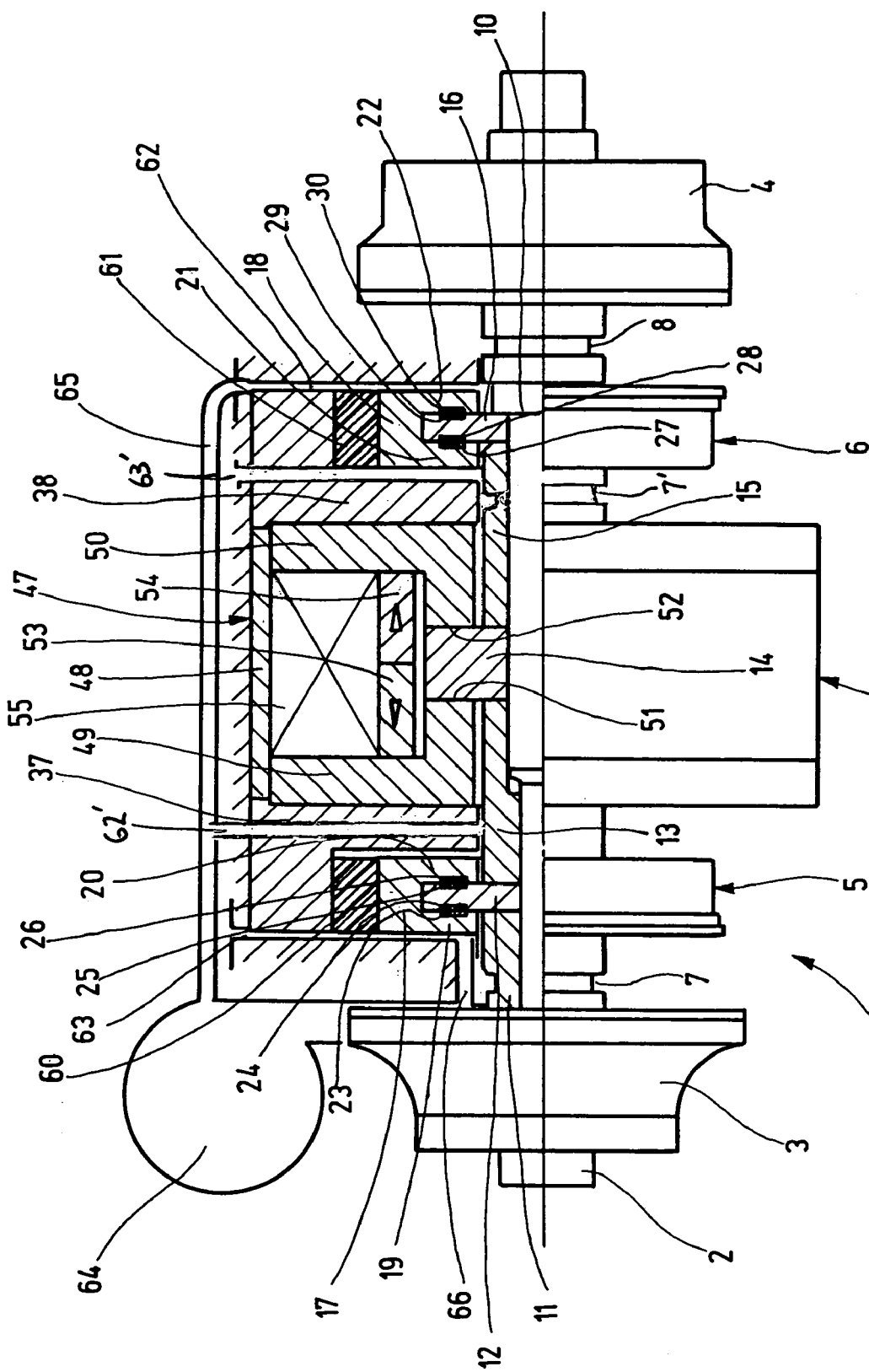
FIG. 2 shows the side view of an exhaust gas turbocharger similar to FIG. 1, except that cooling air is supplied to both bearings simultaneously via compressed air flow ducts (62, 62') and exits via outlet openings (63, 63', 66).

The invention is explained below in more detail by reference to an embodiment which is illustrated schematically in the drawing, in which:

FIG. 1 shows the side view of an exhaust gas turbocharger with parts of a bearing housing with a partially sectional view of the upper part of the bearing of the shaft and with flow ducts, provided in the bearing housing, for cooling air to be applied to the bearings first to the turbine side bearing and subsequently to the compressor side bearing, and FIG. 2 shows the side view of an exhaust gas turbocharger similar to FIG. 1, except that cooling air is supplied to both bearings simultaneously via compressed air flow ducts (62, 62') and exits via outlet openings (63, 63 ', 66).

DETAILED DESCRIPTION OF THE INVENTION

The exhaust gas turbocharger 1 which is illustrated in FIG. 1 has a shaft 2 at the left end of which a compressor wheel 3 is seated and at the right end of which a turbine wheel 4 is seated. The compressor wheel 3 is embodied in a manner known per se as a radial compressor.

Between the compressor wheel 3 and turbine wheel 4 there are two radial bearings 5, 6. The radial bearings 5, 6 are adjacent to the compressor wheel 3 or the turbine wheel 4. Between them there are grooves 7, 8 which serve to hold sealing rings, said rings forming limiting bearings with a typical play of approximately ±0.15 mm. Between the radial bearings 5, 6 there is an axial bearing 9.

As is apparent from the upper part of FIG. 1, the shaft 2 is surrounded by a total of six rings which are clamped axially against a collar 10 on the shaft 2. A first shaft sleeve 11 with the groove 7 is followed by a bearing plate 12, a second shaft sleeve 13, a bearing plate 14, a third shaft sleeve 15 and a further bearing plate 16.

The bearing plates 12, 16 are associated with the radial bearings 5, 6. They are each held at their two ends by a yoke 17, 18 which is U-shaped in cross section and coaxially surrounds the shaft 2, each yoke 17, 18 having a pair of radial bearing stators 19, 20 and 21, 22 which form the limbs of the yokes 17, 18. The radial bearing stators 19, 20, 21, 22 and the bearing plates 12, 16 have permanent magnets 23, 24, 25, 26 and 27, 28, 29, 30 which are located axially opposite to one another in the two radial bearings 5, 6. They are polarized in such a way that they attract one another, so that an axially directed and attracting magnet field is produced in the gaps between the bearing plates 12, 16 and the radial bearing stators 19, 20, 21, 22. The magnetic fields center the shaft 2, a radial stiffness of, for example, 160 kN/m being achieved.

The yokes 17, 18 are surrounded radially on the outside by spring-elastic elements 60, 61 which are embodied as cylindrical rings made of plastic material. In order to be able to damp as effectively as possible oscillations which occur, the rings 60, 61 are connected, on the one hand, without a gap to the surface of the yokes 17, 18 lying radially on the outside and, on the other hand, to the radially inner surface of a flange of housing plates 37, 38 which protrudes axially over the yokes 17, 18. The housing plates 37, 38 are connected to the housing (not illustrated in more detail in the drawing) of the turbocharger. The rings 60, 61 have pressure applied to them by radial movements of the yokes 17, 18 and in this way damp the radial movement. The spring stiffness of the rings 60, 61 is in the region of 200 kN/m to 600 kN/m. The damping constant of the rings 60, 61 is approximately 100 kg/s to 300 kg/s.

The bearing plate 14 is associated with the axial bearing 9. It is held on both sides by an annular yoke 47 made of laminated SI iron. The annular yoke 47 is held between the two housing plates 37, 38 and secured. It has an outer yoke casing 48 from which two inwardly directed yoke limbs 49, 50 emerge which have an L-shaped cross section and embrace the bearing plate 14 with limb sections which are directed toward one another, resulting in two magnet gaps 51, 52. Adjacent to the circumferential side of the bearing plate 14 there are two permanent magnets 53, 54 lying axially next to each other within the annular yoke 47, said permanent magnets 53, 54 having opposed axial polarization—symbolized by the triangles. They bear one against the other and against the yoke limbs 49, 50. They are surrounded by an electromagnetic annular coil 55 which fills the space between the permanent magnets 53, 54 and between the yoke casing 48 and the yoke limbs 49, 50.

Owing to the magnetic instability of the shaft 2 in the axial direction, axial stabilization must be brought about by means of the axial bearing 9. This is done when there is an axial deflection of the bearing plate 14 by virtue of the fact that this deflection is sensed by a sensor (not illustrated here in more detail) which is known in the prior art and, as a result, a regulator (not illustrated either) controls the flow of current to the annular coil 55 in such a way that an additional magnetic flux is generated, which magnetic flux leads overall to an asymmetrical distribution of magnetic flux within the axial bearing 9 which counteracts the deflection of the bearing plate.

Gaps are formed between the bearing plates 12, 14, 16 and their stators 19, 20, 21, 22 and yoke limbs 49, 50 and said gaps are connected to one another by means of a flow duct which runs essentially along the shaft axis. The bearing 6 has compressed air applied to it via a flow duct 62, which air is fed via a line 65 which opens into the compressor housing 64. The cooling air stream then flows successively through the bearing gaps of the bearings 6, 9 and 5 and exits through outlet openings 63, 66—provided alternatively or together in the bearing housing 39 or in the rear wall of the compressor housing. In this way, the heat which is generated while the turbocharger is operating is carried away from the comparatively temperature-sensitive magnetic bearings.

The invention claimed is:

1. A method of cooling magnetic bearings (5, 6, 9) of an exhaust gas turbocharger (1), the exhaust gas turbocharger having a housing and a shaft (2) rotatable about its longitudinal axis in the housing and on which a turbine wheel (4) and a compressor wheel (3) are seated and which is guided in radial bearings (5,6) and in at least one axial bearing (9), and the bearings (5, 6, 9) having bearing plates which are arranged on the shaft (2) and stators (19, 20, 21, 22, 49, 50) which are fixed to the housing and are separated from said bearing plates by an air gap, and wherein the radial bearings (5,6) include a plurality of permanent magnets (23, 24, 25, 26, 27, 28, 29, 30) disposed in the air gap between the bearing plates (12, 16) and stators (19, 20, 21, 22), the plurality of permanent magnets (23, 24, 25, 26, 27, 28, 29, 30) being arranged in axially adjacent pairs and being polarized so as to attract one another, whereby an axially directed and attracting magnetic field is produced in the gap between the bearing plates (12, 16) and the stators (19, 20, 21, 22) wherein the bearing gaps have an air stream applied.

2. The method according to claim 1, wherein the air stream is branched off as a partial stream from air which is compressed by means of the compressor wheel (3).

3. The method according to claim 1, wherein the air stream is led through a housing duct (62, 65) to at least one of the hearing gaps.

4. The method according to claim 1, wherein the bearing gaps have an air stream applied independently of one another.

5. The method according to claim 1, wherein further flow ducts are formed in the housing between the bearing gaps such that the air stream flows successively through the bearing gaps.

6. The method according to claim 5, wherein the air stream is led through the bearing gaps from the turbine wheel side to the compressor wheel side.

7. The method according to claim 1, wherein after the air stream passes through at least one bearing gap, the air stream is directed into the region outside the housing via an outlet opening.

8. The method according to claim 7, wherein the outlet opening is provided by omitting a compressor-wheel-side shaft sealing ring.

9. An exhaust gas turbocharger (1) having a housing and having a shaft (2) rotatable about its longitudinal axis in the housing and on which a turbine wheel (4) and a compressor wheel (3) are seated and which is guided in radial bearings (5, 6) which are magnetic bearings and in at least one axial bearing (9), the bearings (5, 6, 9) each having a bearing plate (12, 14, 16) which is seated on the shaft (2) and at least one stator (19, 20, 21, 22, 49, 50) which lies axially opposite said bearing plate on at least one side, thus forming a gap between the bearing plate and the stator, wherein at least one flow duct (62, 65) for supplying an air stream to at least one bearing gap is formed in the housing, and wherein the radial bearings (5,6) include a plurality of permanent magnets (23, 24, 25, 26, 27, 28, 29, 30) disposed in the gap between the bearing plates (12, 16) and the stators (19, 20, 21, 22), the plurality of permanent magnets (23, 24, 25, 26, 27, 28, 29, 30) being arranged in axially adjacent pairs and being polarized so as to attract one another, whereby an axially directed and attracting magnetic field is produced in the gap between the bearing plates (12,16) and the stators (19, 20, 21, 22).

10. The exhaust gas turbocharger according to claim 9, wherein the at least one flow duct opens into a compressor housing (64) of the turbocharger (1).

11. The exhaust gas turbocharger according to claim 10, wherein a cross section of the flow duct (62, 65) is small in comparison with a cross section of a line, leading to the engine, for the compressed air.

12. The exhaust gas turbocharger according to claim 9, wherein the flow duct (62, 65) is formed at least in sections by a pipeline (65) running outside the housing.

13. The exhaust gas turbocharger according to claim 9, wherein a separate flow duct leads to each of the bearings (5, 6, 9).

14. The exhaust gas turbocharger according to claim 9, wherein the gaps of the bearings (5, 6, 9) communicate with one another via further flow ducts formed in the housing.

15. The exhaust gas turbocharger according to claim 14, wherein the flow duct (62, 65) leads to only to the turbine-wheel-side bearing (6).

16. The exhaust gas turbocharger according to claim 9, wherein the housing has at least one outlet opening (63, 66) for the air which flows through the bearings (5, 6, 9).

17. The exhaust gas turbocharger according to claim 16, wherein the outlet opening is formed by a gap between the housing and the shaft (2) in the region of the compressor wheel (3).

* * * * *